Dec. 18, 1923.  
A. MARENGO  
TRAP  
Filed March 13, 1923
1,478,238
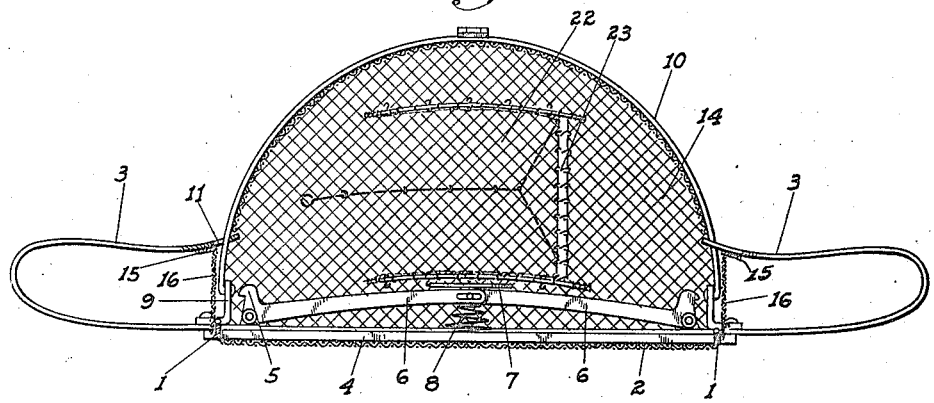
Fig. 1
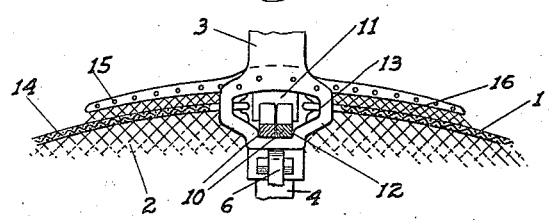
Fig. 2
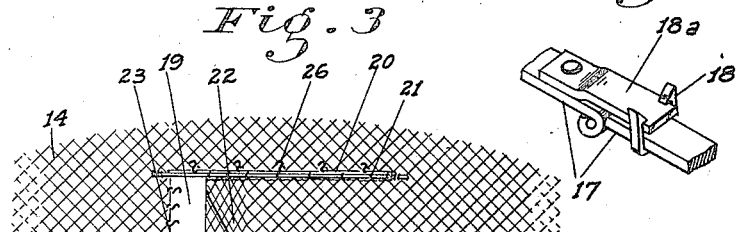
Fig. 3
Fig. 5
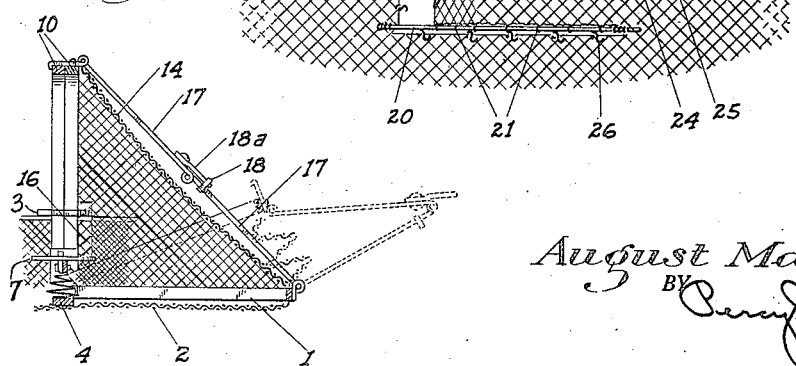
Fig. 4
INVENTOR.
August Marengo
BY
ATTORNEY Patented Dec. 18, 1923.

1,478,238

UNITED STATES PATENT OFFICE.

AUGUST MARENGO, OF STOCKTON, CALIFORNIA.

TRAP.

Application filed March 13, 1923. Serial No. 624,698.

*To all whom it may concern:*

Be it known that I, AUGUST MARENGO, a citizen of the United States, residing at Stockton, county of San Joaquin, State of California, have invented certain new and useful Improvements in Traps; and I do declare the following to be a full, clear, and exact description of the same, reference being had to the accompanying drawings, and to the characters of reference marked thereon, which form a part of this application.

This invention relates to improvements in traps, and especially to that form of trap shown in United States Patent No. 1,441,442, dated January 9th, 1923.

I have found from experimenting with a trap constructed along the lines of the device described in the above named patent, that while the construction as shown therein is suitable for small sizes of the trap, when it came to making traps having quite a few feet span, such as would be large enough to trap large animals, such as bears, etc., the natural weight of certain parts tended to cause the trap to be sprung too readily, but when sprung, the enclosing action was too sluggish, and sometimes failed to be moved to completion.

It is therefore one of the main objects of the present invention to overcome the above defective features.

Another object is to provide means for enabling a trapped animal to be removed from the trap without the possibility of its escape, and without the chance of either the trapper or the animal being harmed.

I have also provided an auxiliary netting to positively enclose the area not covered by the main net, and which must be omitted adjacent the springs to allow the same to function, without in the least interfering with the freedom of action of said springs.

Features have also been included to make the trap more substantial, without greatly increasing the weight and number of parts.

These objects I accomplish by means of such structure and relative arrangement of parts as will fully appear by a perusal of the following specification and claims.

In the drawings similar characters of reference indicate corresponding parts in the several views:

Fig. 1 is a longitudinal section of the trap.

Fig. 2 is a fragmentary top plan view of one of the springs and adjacent parts.

Fig. 3 is a side view of one of the enclosing nets, projected so as to show the same lying flat.

Fig. 4 is a fragmentary cross sections of the trap, showing a bracing means incorporated therewith.

Fig. 5 is a fragmentary view of said bracing means, showing an automatic catch device thereon.

Referring now more particularly to the characters of reference, the numeral 1 denotes a pair of semicircular bands resting on the ground and enclosing a circular area which is covered by netting 2 of suitable character.

Projecting outwardly from and mounted in connection with the band 1 at diametrically opposed points thereon are arch or U-shaped springs 3, a rigid bar 4 extending across the net 2 between the springs to prevent distortion of the band 1 when a strain is put on the springs which tends to draw them together.

The springs 3 are adapted to be held in a compressed position by means of catches 5 which engage the upper portions of the springs at their inner edges, these catches being formed as part of arms or levers 6 which are pivoted on the lower ends of the spring members and extend toward each other over the net 2, and overlap each other at their inner ends. A bait-plate 7 is carried by one of said arms at its inner end, which is centrally of the trap area. Since in a large trap, these arms are quite long and heavy, their own weight tends to cause the catches 5 to be released. To avoid this I mount a light spring 8 just sufficient to sustain at least some of this weight, between the arms 6 and bar 4.

Pivoted in brackets 9 fixed on and projecting upwardly from the lower members of the springs 3 are jaws 10, each preferably the same size and shape as the bands 1, each of which is adapted to move through a 90° arc from a horizontal to a vertical position. the jaws in the latter position abutting against each other for their full length. These jaws pass through transverse slots 11 in the springs 3, which adjacent the inner ends of the springs are just wide enough to receive the two jaws therebetween, as shown at 12, but beyond that widen out considerably as shown at 13. By this means, when the jaws are vertically disposed, they lie in the narrow portions of the slots and are held snug against each other, preventing the escape of anything therebetween, while when they are lying horizontally, they lie in the wider slot portions, giving a greater leverage between the pivotal points of the jaws and the springs at the ends of the portions 13. Thus the springs, without being excessively large and heavy are able, when released, to raise a much heavier jaw structure than would be possible if the narrower width of slot were used throughout. At the same time, if this wider width of slot were used throughout, the jaws would not come together when raised, and would permit of the escape of small animals from thereunder, or would permit a large animal to insert a paw therebetween and possibly pry open and wreck the trap.

Between the jaw bars and the corresponding bands 1, collapsible netting 14 is fixed, so that when the jaws are raised a complete enclosure is formed.

However, to permit of the necessary vertical play of the springs, it is necessary to cut away the netting on each side of the springs from a point on the bands 1 to a point on the jaws above the highest point of movement of the springs.

This leaves an opening through which birds and small creatures might possibly escape.

To cover this opening, without interfering with the spring action, I provide each spring with a horizontal and transversely disposed bar 15, fixed on the upper member of the spring behind the slot therein, and extending for a certain distance on both sides of the net opening on the outside of the jaws and net 14, as plainly shown in Figs. 1 and 2. Fixed on these bars 16 and following the contour thereof from end to end are auxiliary nets 16, which are connected at their lower ends to the bands 1 and at their vertical ends to the nets 14, the height of these auxiliary nets being sufficient to allow of the necessary freedom of movement of the springs.

To prevent any entrapped animals from bulging the side nets outwardly in the endeavor to escape, and possibly upsetting the trap, a vertical bar structure 17, hinged at both ends and at the middle, is fastened on each of the jaws 10 and corresponding band 1 centrally of their length and outside the nets 14, the length of the bar structures being such that when the jaws are furthest from the bands the bars will be outstretched and straight, the hinges thereof being arranged to permit the bars to move outwardly and fold up when the jaws are moved down.

An automatic form of catch means on one bar such as is shown at 18 engages an extension 18$^a$ on the other, and acts to hold the bars against undesired folding up when once outstretched. A brace preventing outward bulging of the net at its widest portion, and also preventing any downward movement of the jaws, is thus provided, which however may be omitted if thought unnecessary.

To allow animals trapped to be placed in cages etc. for transportation, without unspringing the trap and having to subdue, tie, or otherwise handle the animal in any way, I form one of the side nets 14 with an opening 19, preferably rectangular. Rods 20 are placed along the top and bottom of the opening and fixed to the netting, these rods having rings 21 slidable thereon which are fastened to the top and bottom edges of a closure-curtain 22 formed preferably of the same flexible netting as the main net 14, permanently secured thereto from top to bottom at one end, but free at the other end, the latter being normally held to the netting 14 by detachable hooks 23.

Flexible pull cords 24 are connected at suitable points on the free ends of the curtain, the main cord passing horizontally through a guide loop 25 fixed on the net 14 beyond the curtain.

It will therefore be seen that if the hooks 23 are undone, an operator, standing to one side of the curtain, by pulling on the cord 24 will cause the curtain to move horizontally from the opening 19, folding up as it is moved in the same manner as a fabric curtain. A cage or box having previously been placed adjacent the net with its mouth over the area of the opening, sliding back of the curtain provides an entrance from the trap to the cage, into which the animal may easily be caused to enter.

To prevent the rods 20, which must be clear of the net from end to end to allow the rings 21 to slide on the same, from bulging out with the pressure of an animal in the cage trying to escape, detachable hooks 26 are fixed on the netting above and below the rods at intervals, and adapted to be engaged with the latter when the curtain is closed.

The folding up of the net 14 vertically with the lowering of the jaws, is not interfered with by the rods 20, since these are horizontally disposed. The curtain 22, being flexible in all directions, can fold up as readily in a vertical as in a horizontal direction.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the appended claims.

Having thus described my invention, what I claim as new and useful and desire to secure by Letters Patent is:

1. In a trap, opposed springs, catches to hold them compressed, arms extending from the catches toward each other, a bait plate over the arms at the adjacent ends thereof, and a spring under the arms at said ends and of a strength sufficient to support a certain portion of the weight thereof.

2. In a trap, opposed springs, catches to hold them compressed, arms extending from the catches toward each other, a bar extending between the springs under the arms, and spring means between said arms and the bar to support a certain portion of the weight of the arms.

3. In a trap, bands to rest on the ground and enclosing a certain area, jaws to swing from the plane of the bands upwardly toward each other, flexible net structures extending between and connected to said bands and jaws, rigid bars hinged at their ends and centers connected to and extending between the jaws and bands outside the nets, and means whereby when the jaws have moved upwardly to lie adjacent each other the bars will be held from turning on their hinges.

4. In a trap, bands to rest on the ground and enclosing a certain area, jaws to swing from the plane of the bands upwardly toward each other, flexible net structures extending between and connected to said bands and jaws, rigid bars hinged at their ends and centers connected to and extending between the jaws and bands outside the nets, a rigid extension fixed on each bar adjacent its central hinge and overlapping the other bar, and catch means on the other bar automatically engaging said extension when the jaws are moved adjacent each other.

5. In a trap, flat springs arranged for vertical expanding movement, jaws passing through slots in the springs and curving outwardly away from the springs, and brackets under the slots in which the jaws are pivoted; the slots adjacent the free ends of the springs being of a width sufficient to contain the jaws therein in close transverse alinement, but widening out in those portions farthest away from the free ends.

6. In a trap, bands to rest on the ground and enclose a certain area, jaws to swing from the plane of the bands upwardly toward each other, flat slotted springs through which the jaws pass and arranged to control the movement thereof, flexible net structures connected to and extending between the bands and jaws, said nets being cut away from the jaws for those portions on which the springs move, and auxiliary net structures depending from the springs outwardly of the jaws and extending past the edges of the net opening on both sides of the spring.

7. In a trap, bands to rest on the ground and enclose a certain area, jaws to swing from the plane of the bands upwardly toward each other, flat slotted springs through which the jaws pass and arranged to control the movement thereof, flexible net structures connected to and extending between the bands and jaws, said nets being cut away from the jaws for those portions on which the springs move, transverse bars fixed on the movable members of the springs outwardly of the jaws and nets and extending on each side of the springs beyond the edges of the net openings, and auxiliary flexible nets depending from the bars and attached thereto and to the first mentioned bands.

8. In a trap, an enclosing net structure provided with an opening, and a flexible curtain structure normally covering said opening, and slidably mounted on the main net structure for vertical folding movement away from one end of the opening.

9. In a trap, an enclosing net structure provided with a side opening, horizontal rods above and below said opening mounted on the net and a flexible curtain structure slidably mounted on the rods for vertical folding movement and normally covering the opening.

10. In a trap, an enclosing net structure provided with a side opening, horizontal rods above and below said opening mounted on the net, a flexible curtain structure slidably mounted on the rods for vertical folding movement and normally covering the opening, said curtain being permanently attached to the main net at one vertical edge of the opening, pull cords connected to the other end, and guide means for said cord on the main net beyond the end of the opening to which the curtain is attached.

In testimony whereof I affix my signature.

AUGUST MARENGO.